US012377346B2

(12) United States Patent
Aldridge et al.

(10) Patent No.: US 12,377,346 B2
(45) Date of Patent: Aug. 5, 2025

(54) DYNAMICALLY GENERATED LOCAL VIRTUAL EVENTS

(71) Applicant: Niantic, Inc., San Francisco, CA (US)

(72) Inventors: Tim Aldridge, Seattle, WA (US); Gordon Paul Jeffery, III, Kirkland, WA (US); Stephen Wang, Kirkland, WA (US)

(73) Assignee: Niantic, Inc., San Francisco, CA (US)

( * ) Notice: Subject to any disclaimer, the term of this patent is extended or adjusted under 35 U.S.C. 154(b) by 285 days.

(21) Appl. No.: 17/903,929

(22) Filed: Sep. 6, 2022

(65) Prior Publication Data
US 2024/0075379 A1 Mar. 7, 2024

(51) Int. Cl.
 *A63F 13/00* (2014.01)
 *A63F 13/216* (2014.01)
 *G06T 19/00* (2011.01)

(52) U.S. Cl.
 CPC .......... *A63F 13/216* (2014.09); *G06T 19/006* (2013.01); *A63F 2300/8082* (2013.01)

(58) Field of Classification Search
 CPC ............ A63F 13/216; A63F 2300/5573; A63F 2300/69; A63F 2300/8082; A63F 13/25; A63F 13/35; A63F 13/352; G06T 19/006; G07F 17/3272
 See application file for complete search history.

(56) References Cited

U.S. PATENT DOCUMENTS

| 8,469,824 | B1* | 6/2013 | Farley | F41J 5/02 |
| | | | | 434/21 |
| 8,663,014 | B2* | 3/2014 | Xu | A63F 13/79 |
| | | | | 463/9 |
| 9,257,014 | B1* | 2/2016 | Allen | G07F 17/3258 |
| 9,659,448 | B1* | 5/2017 | Mileski | G07F 17/3293 |
| 11,358,052 | B2* | 6/2022 | Baba | A63F 13/822 |

(Continued)

FOREIGN PATENT DOCUMENTS

CN 103760972 A 4/2014

OTHER PUBLICATIONS

Wiki, Pokémon Go, Jul. 29, 2017,<https://en.wikipedia.org/w/index.php?title=Pok%C3%A9mon_Go&oldid=792957842> (Year: 2017).*

(Continued)

*Primary Examiner* — Justin L Myhr
(74) *Attorney, Agent, or Firm* — Fenwick & West LLP (57) ABSTRACT

A game server provides game data of a location-based game to a plurality of client devices based on a first set of one or more game designs. First activity data associated with the location-based game is received from the plurality of client devices based on the first set of one or more game designs. The game server determines whether the first activity data from the plurality of client devices meets a predetermined starting condition associated with a local virtual event. The local virtual event is started for the plurality of client devices in response to determining that the first activity data meets the predetermined starting condition. The game server provides game data based on the local virtual event to the plurality of client devices. The virtual event has a second game design that is different from the first set of one or more game designs.

20 Claims, 6 Drawing Sheets

(56) References Cited

U.S. PATENT DOCUMENTS

| | | | |
|---|---|---|---|
| 2007/0149286 A1* | 6/2007 | Bemmel | G07F 17/3223 |
| | | | 463/41 |
| 2011/0151955 A1* | 6/2011 | Nave | A63F 13/837 |
| | | | 463/2 |
| 2019/0217202 A1 | 7/2019 | Komori et al. | |
| 2020/0298112 A1* | 9/2020 | Fish | A63F 13/332 |
| 2021/0049860 A1 | 2/2021 | Caputo et al. | |
| 2021/0170229 A1 | 6/2021 | Tormasov et al. | |
| 2021/0228988 A1 | 7/2021 | Franceus et al. | |

OTHER PUBLICATIONS wowhead.com, "Timewalking Raid Guide: The Black Temple", Mar. 5, 2021, <https://www.wowhead.com/guide/timewalking-raid-guide-the-black-temple-5291#:~:text=After%20you%20assemble%20a%20group%20with%2010%20to,people%2C%20it%20is%20time%20to%20enter%20the%20raid> (Year: 2021).*

Mystic7, "My First Gym Raid Ever in Pokemon Go! What is Gym Raiding Like?", youtube.com, Jun. 23, 2017, <https://www.youtube.com/watch?v=2SfKHtWNC4s&t=17s> (Year: 2017).*

PCT International Search Report and Written Opinion, PCT Application No. PCT/IB2023/058687, Dec. 4, 2023, 9 pages.

* cited by examiner

DYNAMICALLY GENERATED LOCAL VIRTUAL EVENTS

BACKGROUND

1. Technical Field

The subject matter described relates generally to location-based games, and, in particular, to dynamically generating local virtual events for similarly-located players in a location-based game.

2. Problem

Location-based games use the real world as their geography. Parallel reality games are a type of location-based game that use a virtual world that parallels the real-world geography. Players can interact and perform various game objectives in the parallel virtual world by navigating and performing actions in the real world. When actions are primarily undertaken with reference to the virtual world, the virtual world can act as a barrier to players experiencing the virtual world as truly parallel to the real world. Rather, players may experience the real and virtual worlds as distinct and relatively unconnected. This is especially true when players playing in the same physical locations in the real world do not experience adequate communal interaction with the similar-located players in the virtual world. Such experiences may decrease player engagement over time.

SUMMARY

This disclosure pertains to increasing player engagement in a parallel reality game. Techniques disclosed herein look to increase player engagement by incorporating into the user experience, spontaneous viral moments (e.g., local virtual events, implicit social events) that a player may choose to participate in during game play. The local virtual events may be of different types and may have respective different game designs, corresponding objectives and rules, and access-controlled game content. The local virtual events may be automatically triggered during game play based on one or more corresponding predetermined starting conditions being met. From the user's perspective, the viral moments may be spontaneous, since the starting conditions that trigger the viral moments may be unknown to the user. The chance of such spontaneous viral moments occurring during game play may increase the level of engagement or interest of the player in the parallel reality game and increase the amount of time the player wishes to spend playing the parallel reality game.

The local virtual events may be of different types and may have corresponding game designs respectively specifying its game objectives and game rules, and may have corresponding exclusive (access-controlled) game content. Further, each type of local virtual event may have a corresponding predetermined starting condition and a corresponding predetermined ending condition. The conditions may specify, e.g., where, when, and how often the specified type of local virtual event may be triggered, how long it may last, its relative rarity of occurrence, how often players can participate in the event, and the like. For example, the predetermined starting condition for triggering a given type of local virtual event may specify that a number of active similarly-located players in a same physical location in the real world (e.g., a number of active player devices within a predetermined real-world area corresponding to a predetermined virtual element and within a predetermined range from the virtual element) must at least be a predetermined number. As another example, the predetermined starting condition may specify that the predetermined number of active players in the predetermined area must complete predetermined in-game actions (e.g., each player captures a predetermined number of virtual items or objects; prerequisite game action), and the like. The predetermined ending condition may specify a time duration for the local virtual event (e.g., 30 minutes). One type of local virtual event may be a shared AR session where the similarly-located players in the same physical location in the real world may get the opportunity to spontaneously engage in an organized community game (e.g., live game actions associated with a particular geographic location) and play together or against each other as one or more teams or factions.

The local virtual events may be implicit. That is, unbeknownst to the similarly-located players playing their respective (group or individual) game sessions under respective game designs (e.g., first set of one or more game designs), the predetermined starting condition for a given local virtual event may become satisfied (e.g., based on number of active players in the local area, number of active players in the local area completing predetermined virtual in-game actions, and the like). And as a result, the identified number of similarly-located players may get notifications inviting them to join an implicit social event that is about to start and indicating a time at which the event is going to start. The notification may further specify the game objectives (e.g., corresponding to a second game design) of the implicit social event. In some embodiments, in response to the predetermined starting condition for the given local virtual event being satisfied, the implicit social event may start automatically (e.g., instantly) without a notification and the game mechanics for the identified number of similarly-located players (that caused the event to be triggered) may automatically be adjusted based on the second game design (e.g., the identified numbers of similarly-located players may automatically obtain access to access-controlled content associated with the local virtual event)

During game play of the local virtual event, an achievement tracker may be presented to each of the similarly-located players of the implicit social event. The achievement tracker may present individual or collective achievement data based on the game objectives of the implicit social event. At the end of the implicit social event, the game design (e.g., game objectives, game rules) for each of the similarly-located players of the local virtual event may revert back to its previous state that existed prior to the start of the local virtual event. Thus, by incorporating into the user experience, spontaneous viral moments of organized community game actions or activities for players that happen to be similarly-located in the real-world at a given point in time, awareness of the currently similarly-located player community in the real-world can be increased, and a more "real" parallel reality (e.g., AR, VR) game experience can be achieved.

In one embodiment, a computer-implemented method includes a step of providing, by a game server, game data of a location-based game to a plurality of client devices based on a first game design. The method further includes a step of receiving first activity data associated with the location-based game from the plurality of client devices based on the first game design. In addition, the method includes a step of determining whether the first activity data from the plurality of client devices meets a predetermined starting condition associated with a local virtual event. Still further, the method includes a step of starting the local virtual event for the plurality of client devices in response to determining that the first activity data meets the predetermined starting condition. And still further, the method includes a step of providing, by the game server, game data based on the local virtual event to the plurality of client devices. The local virtual event may have a second game design that is different from the first game design.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Figure 1:
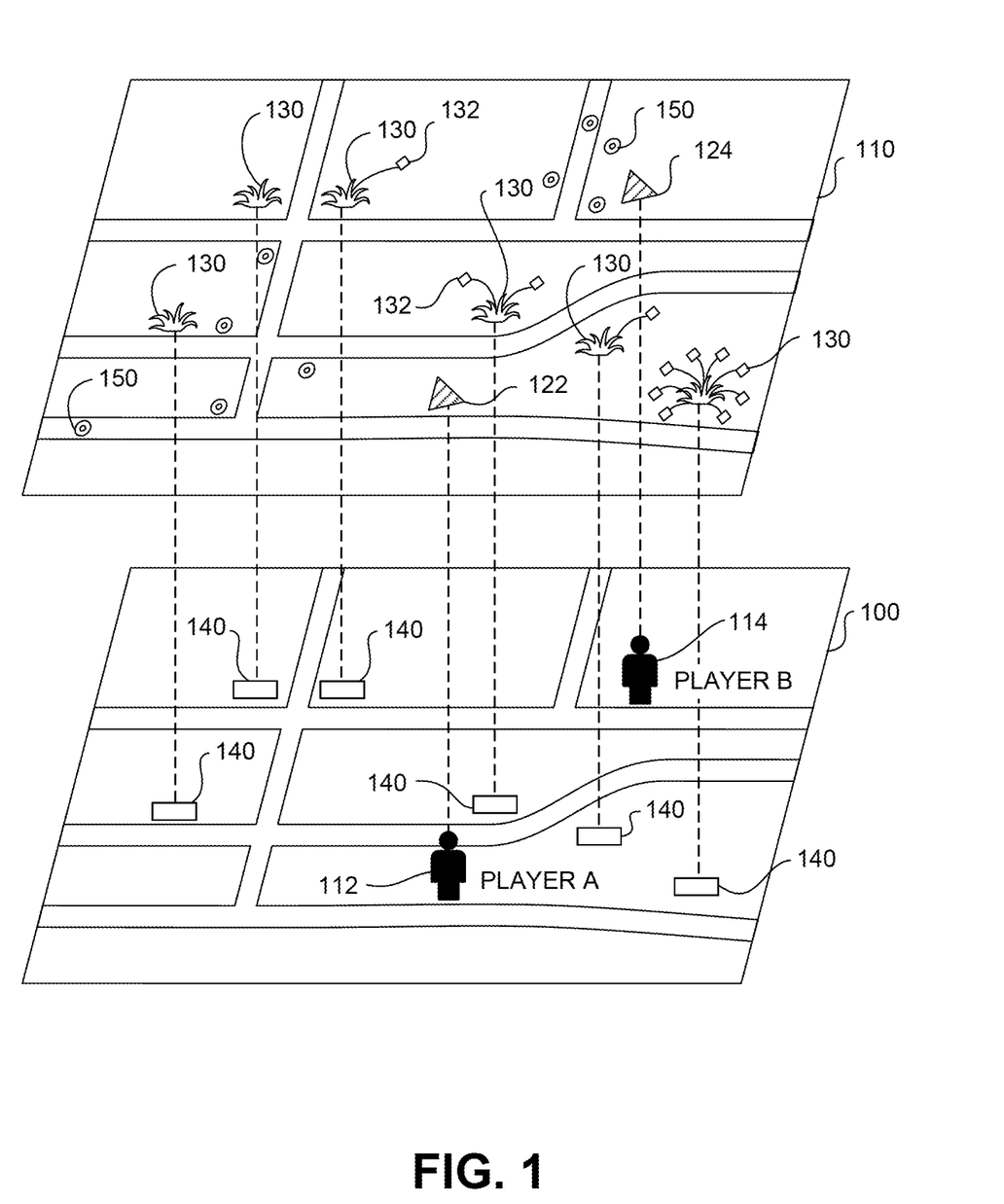
FIG. 1 depicts a representation of a virtual world having a geography that parallels the real world, according to one embodiment.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where dynamically generating a local virtual event (e.g., implicit social event) for similarly-located players in a location-based game based on predetermined conditions is desirable. In addition, the inherent flexibility of computer-based systems allows for a great variety of possible configurations, combinations, and divisions of tasks and functionality between and among the components of the system.
Example Location-Based Parallel Reality Game FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include multiple game designs (e.g., corresponding to games (e.g., multi-player organized community games), events or moments within games, and the like) each game design having corresponding game objectives and game rules, and controlling access to corresponding game content (e.g., virtual elements, virtual energy, virtual items, virtual objects). The game objectives require players to travel to or interact with various virtual elements or virtual objects scattered at various virtual locations in the virtual world 110, consistent with corresponding game rules of the game design. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game design's game objective may have players interacting with virtual elements 130 (e.g., points of interest) located at various virtual locations in the virtual world 110. These virtual elements 130 can be linked to landmarks, geographic locations, or objects 140 (e.g., waypoints) in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A 112 may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives of the game design may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
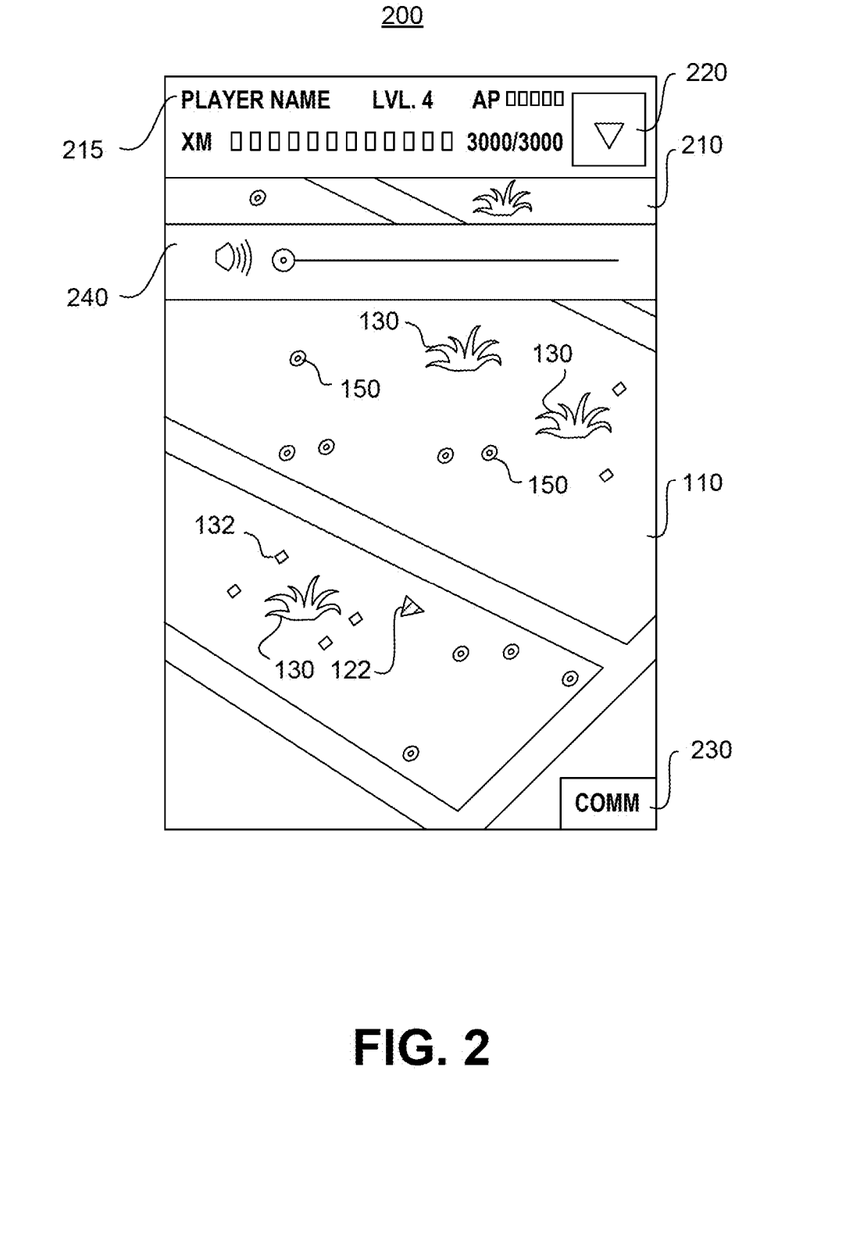
FIG. 2 depicts an exemplary game interface of a parallel reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event (e.g., implicit social event) happens nearby in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Gaming System

Figure 3:
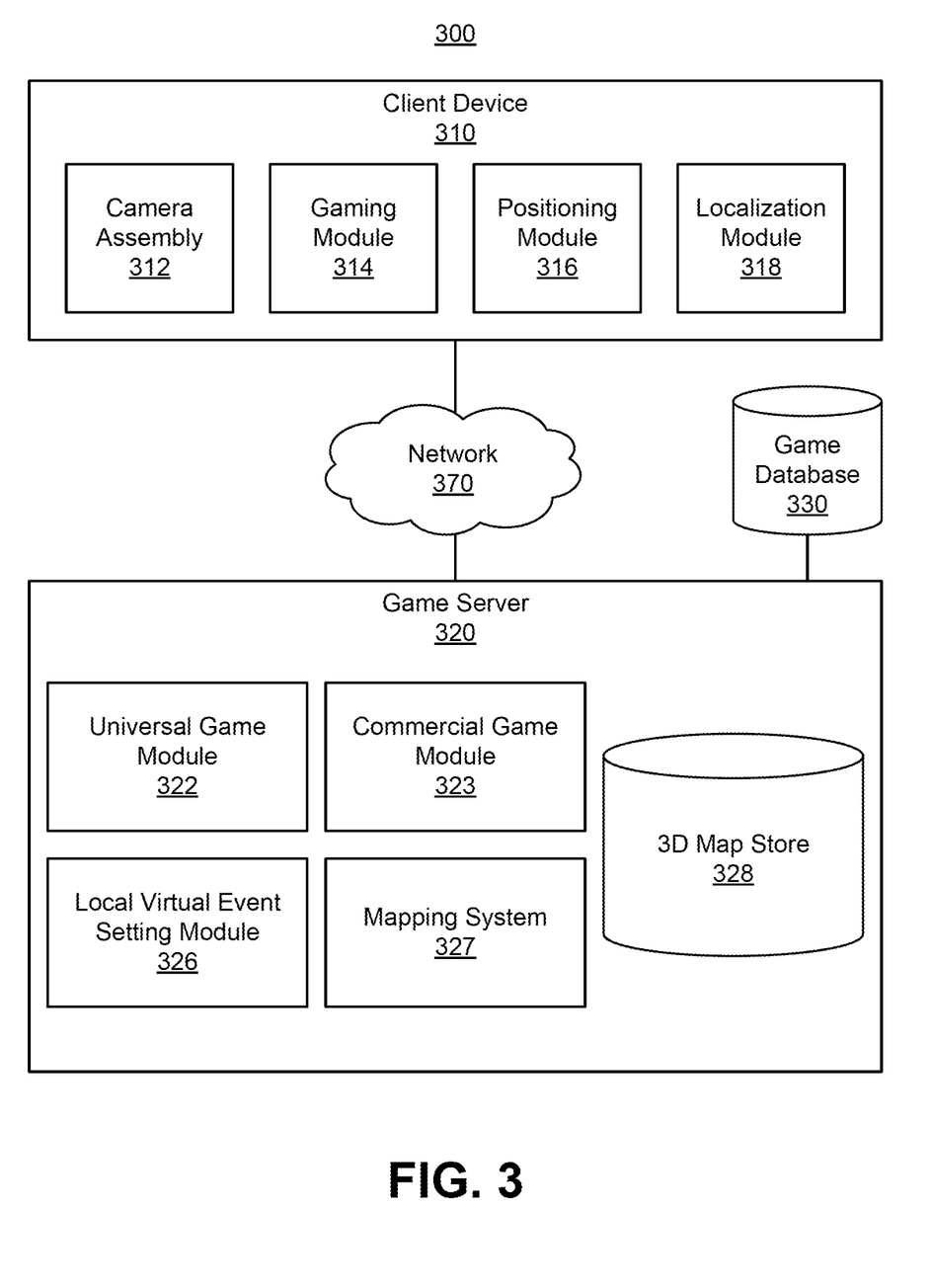
FIG. 3 is a block diagram of a networked computing environment suitable for dynamically generating a local virtual event for similarly-located players in a location-based game, according to one embodiment.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, a positioning module 316, and a localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 110 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose, etc.) or capture data (e.g. exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives based on the game design. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314 (e.g., real-world activity data). The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 receives the location determined for the client device 310 by the positioning module 316 and refines it by determining a pose of one or more cameras of the camera assembly 312. In one embodiment, the localization module 318 uses the location generated by the positioning module 316 to select a 3D map of the environment surrounding the client device 310. The localization module 318 may obtain the 3D map from local storage or from the game server 320. The 3D map may be a point cloud, mesh, or any other suitable 3D representation of the environment surrounding the client device 310.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dead reckoning based on sensor readings, periodic re-localization, or a combination of both. Having an accurate pose for the client device 310 may enable the game module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The game server 320 includes one or more computing devices that provide game functionality to the client device 310. The game server 320 can include or be in communication with a game database 330. The game database 330 stores game data used in the parallel reality game to be served or provided to the client device 320 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) game design data associated with a plurality of game designs and respective game objectives and game rules of each game design (e.g. a first set of one or more game designs (e.g., one or more master or default game designs) for the location-based game, a second game design (e.g., one or more local virtual event game designs respectively corresponding to one or more types of local virtual events or implicit social events), etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements, etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status for a respective game design (e.g. current number of players, current status of game objectives, player leaderboard, etc.); (7) data associated with player actions/input for a respective game design (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from users (e.g., players) of the system 300, such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g. player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal game module 322, a commercial game module 323, a local virtual event setting module 326, a mapping system 327, and a 3D map store 328. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players (which may include multiple simultaneous sessions based on multiple game designs for different player subsets). As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The local virtual event setting module 326 manages player access to different types of local virtual events (e.g., implicit social events) in the parallel reality game. Although the term "event" is used for convenience, it should be appreciated that this term need not refer to a specific event at a specific location or time. Rather, it may refer to any provision of access-controlled game content where one or more access criteria (e.g., predetermined starting condition) are used to determine whether players may access that content. Such content may be part of a larger parallel reality game that includes game content with less or no access control or may be a stand-alone, access controlled parallel reality game. Features and configuration of the local virtual event setting module 326 are described in detail below in connection with FIGS. 4 and 5.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects (tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 328. The 3D map may be stored in the 3D map store 328 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 4:
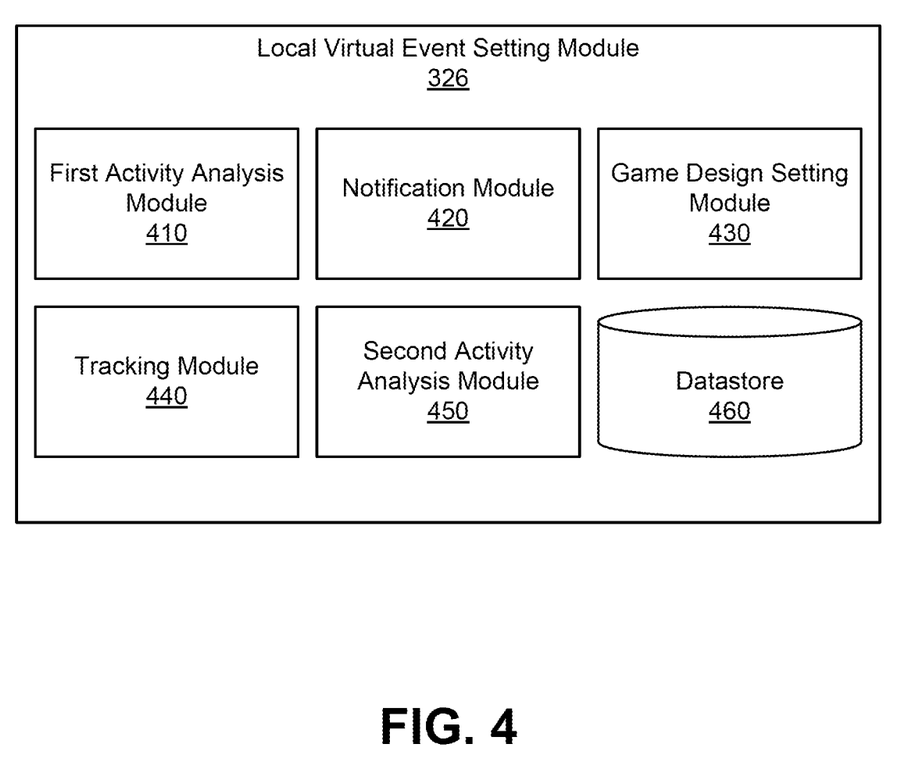
FIG. 4 is a block diagram of the local virtual event setting module shown in FIG. 3, according to one embodiment.

FIG. 4 is a block diagram of the local virtual event setting module 326 shown in FIG. 3, according to one embodiment. As explained previously, access-controlled game content (e.g., corresponding to a local virtual event) may be provided in the location-based game to an identified set of similarly-located players to create viral moments that appear spontaneous to the players, thereby increasing player engagement and increasing the amount of time the players may wish to spend playing the parallel reality game. The functionality for providing such access-controlled game content (based on corresponding game design) may be implemented by the local virtual event setting module 326.

In the embodiment shown in FIG. 4, the local virtual event setting module 326 includes first activity analysis module 410, notification module 420, game design setting module 430, tracking module 440, second activity analysis module 450, and datastore 460. In other embodiments, the local virtual event setting module 326 contains different or additional elements. In addition, the functions may be distributed among the elements in a different manner than described.

As explained previously, the instance of the parallel reality game for the set of players (e.g., all players of the parallel reality game) may be hosted by the universal game module 322 of the game server 320 using game data from the game database 330. The instance of the parallel reality game for the set of players may correspond to a predetermined range of coordinates defining the geographic area or space in the real world that is mapped to a corresponding range of coordinates defining a virtual space in the virtual world, and the range of coordinates in the real world can be associated with a town, neighborhood, city, campus, locale, a country, continent, the entire globe, or other geographic area. The parallel reality game instance may be a multi-player location-based game instance where every participant in the game shares the same virtual world. Further, the players may be divided into separate game or AR sessions having corresponding game designs (e.g., first set of one or more game designs). For example, different subsets of players may be playing under different game designs having different game objectives based on different congregations of the player subsets at real world locations within the predetermined range of coordinates defining the geographic area (e.g., town). That is, a first group of congregated players at a first real-world location in the parallel reality game may be associated with a shared AR session (e.g., a group event with a shared game objective), and the overall parallel reality game instance may simultaneously be hosting multiple such shared AR sessions based on multiple congregations of players at different (or same) real world locations within the geographic area (e.g., town).

As such, a first set of one or more game designs (having corresponding game objectives and game rules and game content) may be respectively set for the respective congregations of the players from among the set of players of the overall parallel reality game instance. For example, a master or default game design (e.g., first set of one or more game designs) may be set for all players of the game instance corresponding to the geographic area. In addition, respective game designs (e.g., first set of one or more game designs) may be set for respective congregations of players (from among all players of the game instance corresponding to the geographic area) playing at respective (same or different) real world locations within the geographic area. And the game design(s) applicable to a given player in the geographic area may dictate the game objectives and the game rules for the player of the parallel reality game, and control what game content is provided to the client device associated with the given player.

During game play, the players may operate respective client devices to interact with the parallel reality game instance based on the corresponding game designs and generate game data (e.g., first activity data). For example, a game design's game objective may have corresponding players interacting with virtual elements or objects located at various virtual locations in the virtual world. The interactions may include capturing, claiming ownership of, using some virtual item, spending some virtual currency, etc. Data generated based on the interactions may be transmitted by the respective client devices to the game server as virtual world activity data. For example, the virtual world activity data includes virtual in-game action data associated with an action request input by a user of a client device in a virtual world of the location-based game and an outcome of the action request determined by the game server. Further, the client devices may provide to the game server and during game play under the respective game design, location data (e.g., geolocation data, GPS data) indicating a geographic location of the client device in the real-world within the geographic area. The location data may be transmitted by the client device as a background process at a predetermined frequency (e.g., every second) or may be transmitted based on another rule system (e.g., based on a request from the game server, based on a location update detected by the client device, and the like). The location data generated by the client devices may be transmitted to the game server as real-world activity data. Another example of real-world activity data may be the user performing a predetermined action (e.g., image capture at a predetermined real-world location or of a predetermined real-world object) using the client device.

The first activity analysis module 410 may be configured to analyze first activity data (e.g., the virtual world activity data, the real-world activity data) from each of the plurality of players (e.g., all of the players) of the parallel reality game instance in the geographic area. To perform the analysis, the first activity analysis module 410 may determine based on the first activity data from the client devices associated with all of the set of players in the geographic area whether the predetermined starting condition of one of the plurality of types of local virtual events has been met. The data corresponding a plurality of types of local virtual events (including respective predetermined starting condition data) may be stored in the datastore 460, and the first activity analysis module 410 may access the data stored in the data store 460 to compare the received first activity data with the data corresponding to the predetermined starting conditions for the different types of local virtual events that can be triggered by the game server and make the determination.

For example, the predetermined starting conditions for different types of local virtual events may specify one or more of: (1) a predetermined virtual element or object or item that is located at a predetermined virtual location in the virtual world and that corresponds to a predetermined location (e.g., a landmark in a park, a stadium, a farmer's market, and the like) in the real world, (2) a predetermined range (e.g., 50 meters) that is defined relative to the predetermined virtual element/object/item in the virtual world and/or relative to the corresponding predetermined location in the real world, (3) at least a predetermined number of client devices (from among all of the client devices associated with the set of players in the geographic area) located within the predetermined range from the predetermined virtual element (or located within the predetermined range from each other) and determined to be active (e.g., based on ping data that is less than 24 hours old), (4) the predetermined number of active client devices located within the predetermined range from the predetermined virtual element are at least at a predetermined distance from each other (e.g., any two players in the predetermined range are at least 5 meters apart from each other), (5) each of the predetermined number of active client devices has not participated in another instance of the same type of the local virtual event during a predetermined past period (e.g., if a player participates in an event, they will be in a cooldown period of 12 hours before they can participate in the same type of event again), (6) a predetermined date and time when the at least predetermined number of active client devices are to be located within the predetermined range from the predetermined virtual element or from each other, (7) a predetermined in-game action(s) (e.g., the player must capture a predetermined number and/or type of virtual items or objects; prerequisite game action), (8) performance of a predetermined real-world action(s) (e.g., capture an image of a predetermined real-world object or landmark, walk a predetermined distance), and the like.

Thus, for example, a first type of local virtual event may specify (based on corresponding predetermined starting condition) that if there are at least 25 active players within 50 meters of a given landmark at a given park, trigger an instance of the first type of local virtual event. As another example, a second type of local virtual event may specify that if there are at least 50 active players detected at a stadium during a particular football game during a particular date and time range, and each of the 50 active players performs a particular action (e.g., capture a particular virtual item, take a picture of the stadium, and the like), trigger the second type of local virtual event.

The first activity analysis module 410 may further specify conditions to determine whether a player associated with a given client device is an active player (e.g., ping device every hour and if a player of the device has been active in the past 24 hours, identify the player as an active player). By setting the predetermined starting conditions for the different types of local virtual events differently, a variety of different implicit social events can be configured to be triggered in a variety of different ways at different levels of rarity, and at a variety of different locations where there is a likelihood of players to congregate, thereby increasing player engagement. Data associated with the different types of local virtual events may be stored in the datastore 460 and/or the game database 330.

In response to determining that the predetermined starting condition for a given one of the types of local virtual events has been satisfied, notification module 420 may be configured to notify a plurality of client devices that have satisfied the predetermined starting condition for the given type of local virtual event. In some embodiments, the notification module 420 may notify only those players (e.g., identified players) whose first activity data (e.g., capturing a particular virtual element) satisfied the predetermined starting condition. In other embodiments, the notification module 420 may notify a group of players (e.g., identified players) that subsumes the players whose first activity data satisfied the predetermined starting condition and that further includes additional players that may be similarly-located with the players. For example, a particular type of local virtual event's starting condition may require that at least 50 players be congregated within a predetermined range from a given virtual landmark and further require that the 50 players must have performed a particular virtual in-game action while within the range and within a predetermined time period. In this case, if the starting condition for the local virtual event is determined to be satisfied by the module 410, the notification module 420 may notify not just the 50 players that met the predetermined starting condition (by performing the particular virtual in-game action), but also other similarly-located players that may also happen to be within the defined range from the given virtual landmark (but did not perform the particular virtual in-game action).

As explained previously, the local virtual event may be an implicit event in that the players of the parallel reality game instance spread out in the geographic area and engaged in respective game sessions or events (e.g., based on congregations of players in one or more locations in the geographic area) may be unaware of the conditions that cause different local virtual events to be triggered. As a result, the players may not be expecting a given type of local virtual event to occur and occurrence of such an event may appear spontaneous.

To inform the players of the event, when the starting conditions for the given type of local virtual event are determined to be satisfied by the first activity analysis module 410, the notification module 420 may transmit to the identified players a notification (e.g., visual notification, vibratory notification, audible notification, other notification) that the given type of local virtual event has been triggered and that it is about to start. The notification may include additional information based on the game design data associated with the given type of local virtual event. The additional information may include the time when the local virtual event will start (e.g., countdown timer), the play zone (e.g., a predetermined range or area that may be same as or different from the area corresponding to the predetermined starting condition that triggered the event) of the local virtual event, map data indicating the location of the play zone, the game objectives, list of participating players, the duration of the event, and the like. In some embodiments, the notification may act as an invitation to the identified players to join the local virtual event, and each player may have the option to join the event by responding to the notification or ignore the notification.

The game design setting module 430 may set for a group of players' client devices (e.g., client devices notified by the notification module 420, client devices that have responded in to join the local virtual event in response to the notification from the notification module 420) a game design (e.g., second game design) associated with the local virtual event whose starting condition was determined to be met by the first activity analysis module 410 and whose start time and other information was notified to the players by the notification module 420.

In some embodiment, the game design setting module 430 may set for the group of players' client devices, the game design associated with the local virtual event as a background process. That is, when the starting conditions for the given type of local virtual event are determined to be satisfied by the first activity analysis module 410, instead of the notification module 420 transmitting the notification to the identified players that the given type of local virtual event has been triggered and that it is about to start, the game design setting module 430 may directly set the game design based on the triggered given type of local virtual event for the group of players' client devices.

Setting the game design by the game design setting module 430 may affect the game mechanics (e.g., game rules, game objectives, access to access-controlled game content) for the group of players. For example, the game design set by the game design setting module 430 may replace a previous game design that is associated with each client device of the group of client devices. Alternatively, the game design set by the game design setting module 430 may append to the previous game design associated with each of the group of client devices (e.g., grant access to additional access-controlled game content). For example, the group of client devices may be associated with a master or default game design (e.g., first set of one or more game designs). As another example, different subsets of one or more client devices of the group of client devices may be associated with respective game designs (e.g., first set of one or more game designs) having respective game sessions or events and access to respective game content. And the game design set by the game design setting module 430 (e.g., second game design) may replace or be appended to the previous game design for each client device of the group of client devices. In some embodiments, the second game design may grant exclusive access to access-controlled game content (e.g., virtual elements or objects) to the group of client devices engaged in respective game sessions or events. In some embodiments, the second game design may correspond to an organized community game event (e.g., live game associated with a particular geographic location) having a shared AR session where the participating players of the group of client devices play together or against each other as one or more teams or factions toward common objectives.

After start of the local virtual event, the group of client devices for which the game design is set by the game design setting module 430 may engage in game play in the play zone based on the game design of the local virtual event. Game content for the local virtual event may be generated for presentation to the client devices of the group of players. During game play, the players may operate respective client devices to interact with the game content of the local virtual event in the play zone and generate game data (e.g., second activity data).

The tracking module 440 may track the second activity data (e.g., the virtual world activity data, the real-world activity data) from the group of client devices to, e.g., determine progress of the group of players toward the game objective of the game design of the local virtual event. For example, the tracking module 440 may track the virtual in-game action data associated with action requests input by the group of players in a virtual world of the local virtual event and outcomes of the action requests determined by the game server. Based on the tracking, the tracking module 440 may control the notification module 420 to present to the group of client devices, achievement tracking data (e.g., goal tracking data) indicating at least one of an individual achievement and a collective achievement of the group of players based on the game objective of the game design of the local virtual event. The tracking module 440 may also control the notification module 420 to present other information related to the game play such as list of participating players in the play zone, event duration or remaining time, personal score, leaderboard, information regarding other local virtual events about to start nearby, and the like. For example, the local virtual event may have as its game objective, that the identified group of similarly-located players (collectively or individually) capture within the play zone of the event, a predetermined number of (access-controlled, local virtual event-specific) virtual objects within a predetermined time period so that each participating player can win a virtual reward. And in this case, the tracking module 440 may track the locations of the group of players within the play zone, time elapsed for the event, time remaining for the event, current number of virtual objects captured (individually and/or collectively), leader board, virtual reward information, and the like.

The second activity analysis module 450 may be configured to analyze the second activity data from the group of client devices being tracked by the tracking module 440. To perform the analysis, the second activity analysis module 450 may determine based on the second activity data whether a predetermined ending condition associated with the local virtual event has been met. The data corresponding to the predetermined ending condition of the local virtual event may be stored in the datastore 460, and the second activity analysis module 450 may access the data stored in the data store 460 to compare the received second activity data with the data corresponding to the predetermined ending condition and make the determination. For example, the predetermined ending condition may specify one or more of: (1) elapse of a predetermined time period (e.g., 30 minutes) from the start of the local virtual event; (2) (collective or individual) achievement of the game objective of the local virtual event based on the game design, and the like.

In response to determining that the predetermined ending condition for the local virtual event has been satisfied, notification module 420 may be configured to notify the group of client devices of the end of the local virtual event. For example, if prior to the end of the set duration of the local virtual event, the game objective of the local virtual event is determined to be met by the second activity analysis module 450, the notification module 420 may notify the group of client devices that the goal of the local event has been achieved, and the corresponding achievement tracking data may be presented to the client devices of the group of players of the local virtual event. Further, in this example, the second activity analysis module 450 may be configured to update the game data for the players to apply the virtual reward based on the game design to each of the group of players based on successful completion of the objective of the local virtual event.

Further, the game design setting module 430 may be configured so that, in response to the notification module 420 notifying the group of client devices that the predetermined ending condition for the local virtual event has been satisfied and that the event has ended, the game design setting module 430 sets the respective game designs for the group of client devices to a previous game design state that was the game design state prior to the start of the local virtual event. For example, the game design setting module 430 may revert back to respective game designs from among the first set of one or more game designs (e.g., a master or default game design, respective game designs having respective game sessions or events) for each client device of the group of client devices participating in the local virtual event. The game design setting module 430 may thus restrict access to access-controlled game content (e.g., virtual elements or objects) to the group of client devices that was granted to the devices temporarily during the local virtual event. In embodiments where the second game design may correspond to an organized community game event having a shared AR session, end of the local virtual event may cause the game play for the group of players to revert back to a state that existed prior to the players joining the local virtual event. Thus, after the local virtual event has ended, game play for the group of players may continue based on respective game designs having respective game content, objectives, and rules.

Data stored in datastore 460 may include: (1) data associated with the each of a plurality of types of local virtual events including respective access-controlled game content data (e.g., virtual element data), game design data, game objective data, game rule data, starting condition data, ending condition data, and the like; (2) data associated with players of each type of local virtual event and each instance of each type of local virtual event (e.g. player profiles including but not limited to player information, player experience level, player currency, current player positions in the virtual world/real world, player energy level, player preferences, team information, faction information, etc.); (3) game status data for each instance of each type of local virtual event; (4) data associated with player actions/input for each instance of each type of local virtual event (e.g. current player positions, past player positions, player moves, player input, player queries, player communications, etc.); or (5) any other data used, related to, or obtained during implementation of each instance of each type of local virtual event. The game data stored in the datastore 460 can be populated either offline or in real time by system administrators or by data received from users (e.g., players) of the system, such as from a client device over the network.

Example Methods

Figure 5:
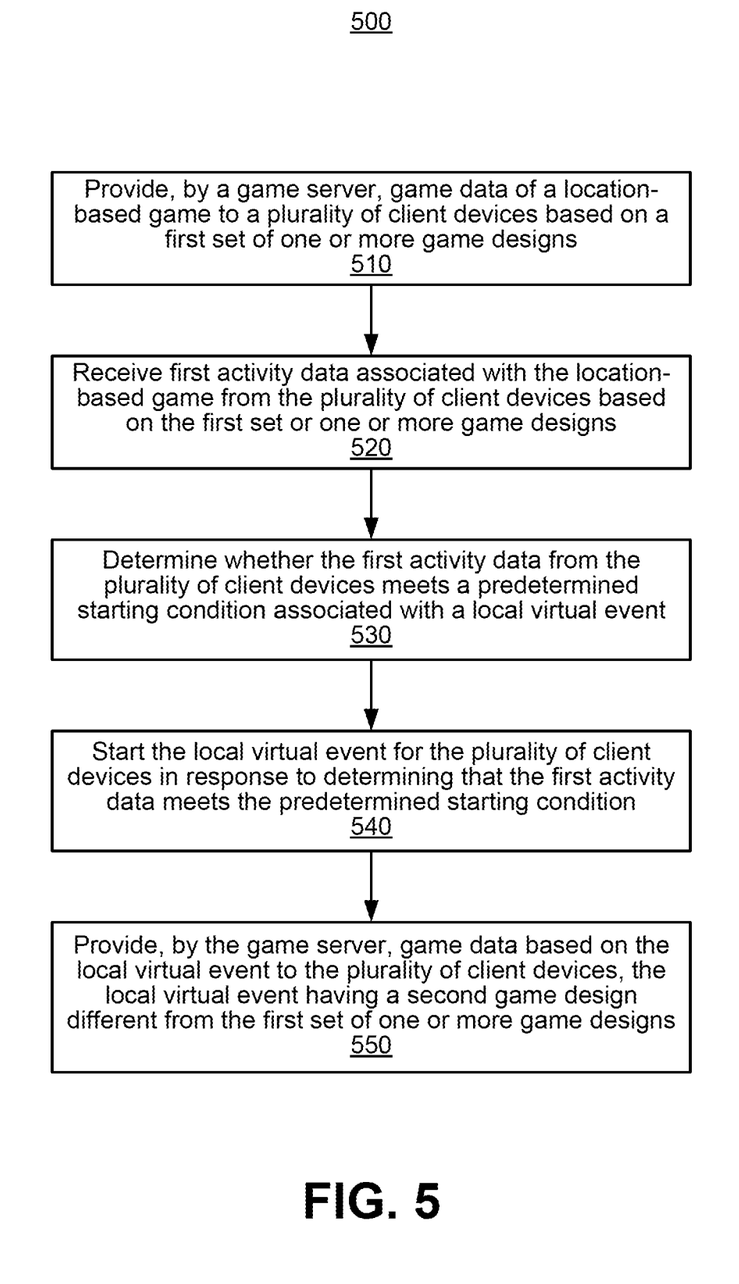
FIG. 5 is a flowchart of a process for dynamically generating a local virtual event for similarly-located players in a location-based game, according to one embodiment.

FIG. 5 is a flowchart describing an example method 500 for dynamically generating a local virtual event for similarly-located players in a location-based game, according to one embodiment. The steps of FIG. 5 are illustrated from the perspective of the game server 320 performing the method 500. However, some or all of the steps may be performed by other entities or components. In addition, some embodiments may perform the steps in parallel, perform the steps in different orders, or perform different steps.

In the embodiment shown, the method 500 begins with the game server 320 providing 510 game data of a location-based game to a plurality of client devices 310 based on a first set of one or more game designs (e.g., master or default game design). The game server 320 may receive 520 first activity data (e.g., location data, in-game action data) associated with the location-based game from the plurality of client devices based on the first set or one or more game designs. The game server 320 may determine 530 whether the first activity data from the plurality of client devices meets a predetermined starting condition (e.g., at least 50 active players within a predetermined range of a particular virtual location in the virtual world) associated with a local virtual event. The game server may start 540 the local virtual event for the plurality of client devices in response to determining that the first activity data meets the predetermined starting condition. And the game server 320 may provide 550 game data based on the local virtual event (e.g., capture as many predetermined virtual items as possible within 30 minutes) to the plurality of client devices. The local virtual event having a second game design different from the first set of one or more game designs. At the end of the method 500 (e.g., after elapse of the predetermined time period corresponding to the local virtual event), the game server may revert the game design back to the first set of one or more game designs and the game play that existed prior the start of the local virtual event may be restored for the plurality of client devices.

Example Computing System

Figure 6:
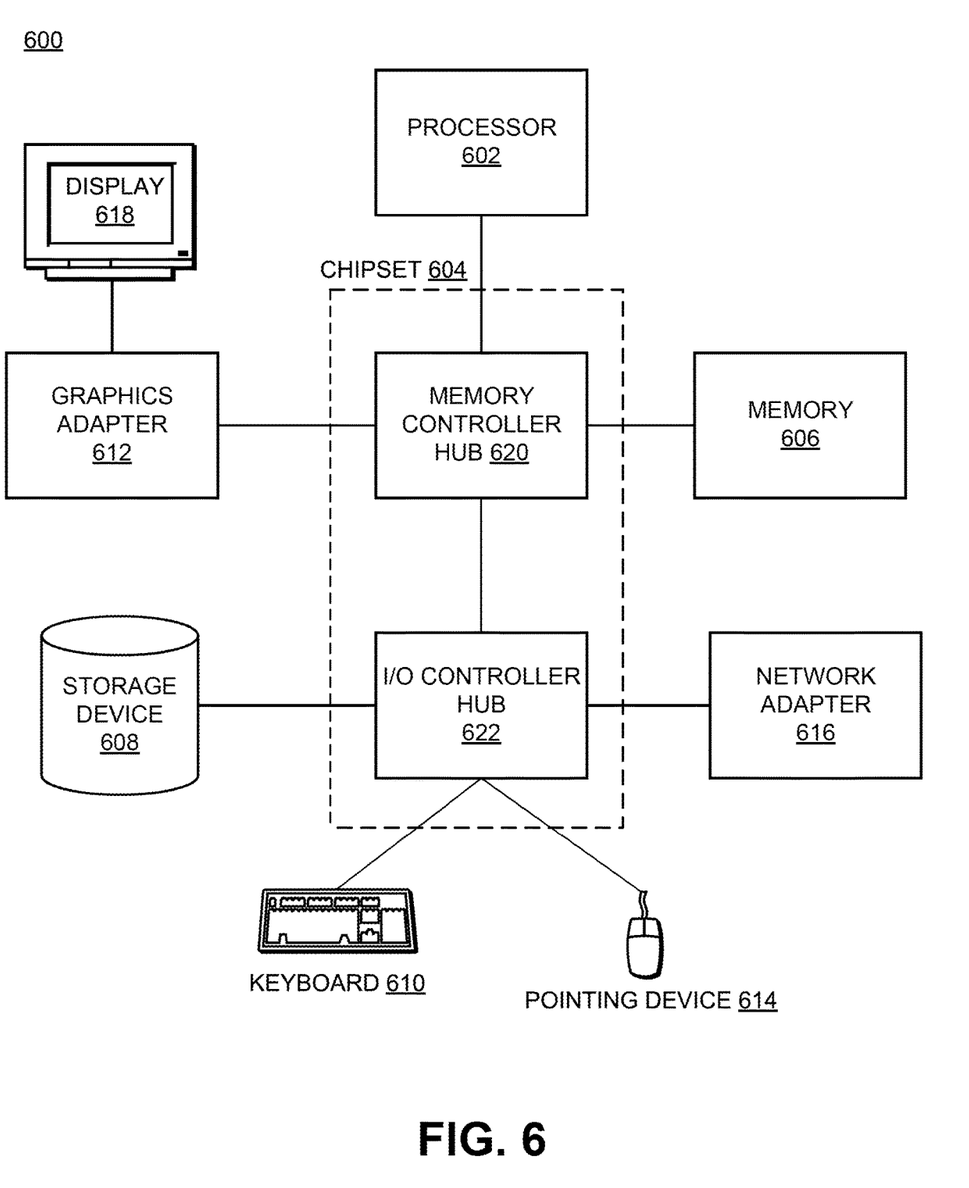
FIG. 6 illustrates an example computer system suitable for use in the networked computing environment of FIG. 1, according to one embodiment.

FIG. 6 is a block diagram of an example computer 600 suitable for use as a client device 310 or game server 320 or local virtual event setting module 326 or to provide functionality of method 500. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and may be used in combination with the keyboard 610 (which may be an on-screen keyboard) to input data into the computer system 600. The graphics adapter 612 displays images and other information on the display 618. The network adapter 616 couples the computer system 600 to one or more computer networks, such as network 370.

The types of computers used by the entities and methods of FIGS. 3-5 can vary depending upon the embodiment and the processing power required by the entity. For example, the game server 320 might include multiple blade servers working together to provide the functionality described. Furthermore, the computers can lack some of the components described above, such as keyboards 610, graphics adapters 612, and displays 618.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method comprising:
   providing, by a game server, game data of a location-based game to a plurality of client devices based on a first set of one or more game designs;
   receiving, at the game server, first activity data associated with the location-based game from the plurality of client devices based on the first set or one or more game designs, the first activity data including geolocation data;
   detecting, at the game server and based on the geolocation data, a spontaneous trigger event indicating that at least a predetermined number of active client devices from among the plurality of client devices are within a predetermined geographic area, the spontaneous trigger event being detected by referencing a data structure storing multiple candidate spontaneous trigger events including the spontaneous trigger event, each candidate spontaneous trigger event specifying a minimum number of active players required to be within a corresponding predefined geographic area to trigger the candidate spontaneous trigger event;
   starting automatically, by the game server and responsive to detecting the spontaneous trigger event, a local virtual event of a shared augmented reality session for the predetermined number of active client devices; and
   providing, by the game server, game data of the local virtual event to the predetermined number of active client devices, the local virtual event having a second game design different from the first set of one or more game designs.

2. The computer-implemented method of claim 1, further comprising:
   receiving second activity data from the predetermined number of active client devices based on the second game design of the local virtual event;
   determining whether the second activity data from the plurality of client devices meets a predetermined ending condition associated with the local virtual event;
   ending the local virtual event for the predetermined number of active client devices in response to determining that the second activity data meets the predetermined ending condition; and
   providing, by the game server and after ending the local virtual event, game data of the location-based game to the predetermined number of active client devices based on the first set of one or more game designs.

3. The computer-implemented method of claim 2, wherein determining whether the second activity data from the predetermined number of active client devices meets the predetermined ending condition comprises one of:
  determining whether a predetermined time period has elapsed since the start of the local virtual event; and
  determining whether a game objective of the second game design have been achieved by users of the predetermined number of active client devices prior to elapse of the predetermined time period.

4. The computer-implemented method of claim 3, further comprising displaying on each of the predetermined number of active client devices and during the local virtual event, achievement tracking data indicating at least one of an individual achievement and a collective achievement based on the game objective of the second game design.

5. The computer-implemented method of claim 1, wherein the predetermined geographic area corresponds to a predetermined range measured from a real-world location associated with a predetermined virtual element at a virtual world location.

6. The computer-implemented method of claim 5, wherein the spontaneous trigger event is detected in response to determining, for each of the predetermined number of active client devices, whether a prerequisite game action based on a game design from among the first set of one or more game designs has been completed within the predetermined geographic area by a user of the active client device.

7. The computer-implemented method of claim 6, wherein the prerequisite game action is one of a virtual in-game action and a real-world action.

8. The computer-implemented method of claim 6, further comprising:
  providing, in the game data based on the local virtual event and to the predetermined number of active client devices, map data indicating a play zone corresponding to the predetermined geographic area.

9. The computer-implemented method of claim 1, wherein the spontaneous trigger event is detected in response to determining that the predetermined number of active client devices are located within a predetermined range of each other.

10. The computer-implemented method of claim 9, further comprising presenting a notification to one or more of the predetermined number of active client devices in response to detecting the spontaneous trigger event, wherein the notification indicates a predetermined time at which the local virtual event is scheduled to start.

11. The computer-implemented method of claim 1, wherein the predetermined number of active client devices is a spontaneous, dynamic group of similarly-located active client devices that causes the spontaneous trigger event to be detected.

12. The computer-implemented method of claim 1, wherein the local virtual event is a spontaneous event triggered by the game server unbeknownst to users of the predetermined number of active client devices.

13. The computer-implemented method of claim 1, wherein the first activity data corresponds to at least one of real-world activity data and virtual world activity data.

14. The computer-implemented method of claim 13, wherein the virtual world activity data includes virtual in-game action data associated with an action request input by a user of a client device in a virtual world of the location-based game and an outcome of the action request determined by the game server.

15. A non-transitory, computer-readable medium storing instructions that, when executed by a computing system, cause the computing system to perform operations comprising:
  providing game data of a location-based game to a plurality of client devices based on a first set of one or more game designs;
  receiving first activity data associated with the location-based game from the plurality of client devices based on the first set or one or more game designs, the first activity data including geolocation data;
  detecting, based on the geolocation data, a spontaneous trigger event indicating that at least a predetermined number of active client devices from among the plurality of client devices are within a predetermined geographic area, the spontaneous trigger event being detected by referencing a data structure storing multiple candidate spontaneous trigger events including the spontaneous trigger event, each candidate spontaneous trigger event specifying a minimum number of active players required to be within a corresponding predefined geographic area to trigger the candidate spontaneous trigger event;
  starting automatically, responsive to detecting the spontaneous trigger event, a local virtual event of a shared augmented reality session for the predetermined number of active client devices; and
  providing game data of the local virtual event to the predetermined number of active client devices, the local virtual event having a second game design different from the first set of one or more game designs.

16. The non-transitory, computer-readable medium of claim 15, wherein the operations further comprise:
  receiving second activity data from the predetermined number of active client devices based on the second game design of the local virtual event;
  determining whether the second activity data from the plurality of client devices meets a predetermined ending condition associated with the local virtual event;
  ending the local virtual event for the predetermined number of active client devices in response to determining that the second activity data meets the predetermined ending condition; and
  providing, after ending the local virtual event, game data of the location-based game to the predetermined number of active client devices based on the first set of one or more game designs.

17. The non-transitory, computer-readable medium of claim 16, wherein the operations for determining whether the second activity data from the predetermined number of active client devices meets the predetermined ending condition comprises operations for one of:
  determining whether a predetermined time period has elapsed since the start of the local virtual event; and
  determining whether a game objective of the second game design have been achieved by users of the predetermined number of active client devices of the local virtual event prior to elapse of the predetermined time period.

18. The non-transitory, computer-readable medium of claim 17, wherein the operations further comprise displaying on each of the predetermined number of active client devices and during the local virtual event, achievement tracking data indicating at least one of individual achievement and collective achievement based on the game objective of the second game design.

19. The non-transitory, computer-readable medium of claim 15, wherein the predetermined geographic area corresponds to a predetermined range measured from a real-world location associated with a predetermined virtual element.

20. The non-transitory, computer-readable medium of claim 19, wherein the spontaneous trigger event is detected in response to determining, for each of the predetermined number of active client devices, whether a prerequisite game action based on a game design from among the first set of one or more game designs has been completed in the predetermined geographic area by a user of the active client device.

* * * * *